United States Patent Office 2,911,451
Patented Nov. 3, 1959

2,911,451

PRODUCTION OF BENZENE

Vladimir Haensel, Hinsdale, Ill., assignor, by mesne assignments, to Universal Oil Products Company, Des Plaines, Ill., a corporation of Delaware No Drawing. Application November 14, 1955
Serial No. 546,799

9 Claims. (Cl. 260—668)

This application is a continuation-in-part of my copending application Serial No. 328,497 filed December 29, 1952, now abandoned.

This invention relates to the conversion of hydrocarbons. It is more specifically concerned with the catalytic conversion of methylcyclopentane and/or cyclohexane to benzene, and of petroleum fractions containing the same, in the presence of a specific catalyst.

The demand for benzene has increased in recent years and although several sources of supply are available, recent developments in the petroleum industry have shown that it is economically feasible to produce large quantities of benzene from selected petroleum fractions. One of these suggested possibilities is the dehydrogenation of cyclohexane and the isomerization of methylcyclopentane to cyclohexane followed by the dehydrogenation of the latter.

I have discovered a process in which benzene is formed from methylcyclopentane and cyclohexane and, further, in yields greater than heretofore. The increased yields are obtainable when the processing conditions and catalyst of my invention are selected.

It is an object of this invention to produce benzene from petroleum fractions containing cyclohexane and methylcyclopentane.

Still another object of this invention is to produce benzene from methylcyclopentane and cyclohexane by subjecting the latter at conversion conditions to contact with a particular catalyst.

In one embodiment my invention relates to a process for the production of benzene which comprises subjecting a cycloparaffin containing 6 carbon atoms per molecule with at least 5 carbon atoms in the ring to the action of hydrogen, and a non-siliceous catalyst comprising alumina, a minor amount of a halogen and a minor amount of a member of the platinum group which catalyst has a surface area between about 75 to 150 sq. meters per gram.

In another embodiment my invention relates to a process for the production of benzene which comprises subjecting a petroleum fraction which contains a cycloparaffin containing 6 carbon atoms per molecule with at least 5 carbon atoms in the ring to the action of hydrogen and a non-siliceous catalyst comprising alumina, a minor amount of halogen, and a minor amount of a member of the platinum group, which catalyst has been treated to lower the surface area.

In a further embodiment my invention relates to a process for the production of benzene which comprises subjecting a select petroleum fraction which contains a cycloparaffin containing 6 carbon atoms per molecule, with at least 5 carbon atoms in the ring, to contact with hydrogen and a non-siliceous catalyst comprising alumina, from about 0.1% to about 8% of halogen by weight of the alumina on a dry basis, and from about 0.01% to about 1% by weight of platinum, which catalyst has a surface area between about 75 to 150 sq. meters per gram.

In a specific embodiment the present invention relates to a process for the production of benzene which comprises subjecting methylcyclopentane at a temperature of from about 600° F., to about 1000° F., a pressure of from about 50 lbs. per sq. inch to about 600 lbs. per sq. inch, a weight hourly space velocity of from about 0.5 to about 20, and a hydrogen to hydrocarbon mol ratio of from about 0.5 to about 20 or more mols of hydrogen per mol of hydrocarbon to contact with a non-siliceous catalyst containing alumina, from about 0.01% to about 1.0% platinum, and from about 0.1% to about 8% halogen by weight of the alumina on a dry basis which catalyst has been steamed to adjust the surface area to between about 75 and 150 sq. meters per gram.

The term surface area as used herein means the surface area of the components as determined by the nitrogen adsorption method of Brunnauer, Emmett, and Teller, published in the Journal of the American Chemical Society, vol. 6, pages 309 et. seq. (1938).

The charging stocks which may be converted to benzene in accordance with my process comprise methylcyclopentane and cyclohexane, alone or in admixture with one another and/or with other hydrocarbons. It is within the scope of this invention to use the pure compound which minimizes product separation problems although normally a charge stock will comprise a hydrocarbon fraction, and more usually a petroleum hydrocarbon fraction containing methylcyclopentane and/or cyclohexane. The former compound boils at 160° F. and the latter compound boils at 177° F. at atmospheric pressure. When the selected hydrocarbon fraction is obtained from a straight-run gasoline, natural gasoline, or the like, the boiling range of the fraction will ordinarily lie within the range of from about 150° F. to about 185° F. When desired the boiling range may be made somewhat narrower which will decrease the expense of separating the benzene from the total product. As hereinbefore mentioned, pure methylcyclopentane obtained from petroleum sources or other sources, may economically and readily be converted to benzene by employing the process of my invention.

The catalyst used in my process comprises alumina containing minor amounts of combined halogen and a member of the platinum group, i.e. ruthenium, rhodium, palladium, osmium, iridium and platinum. The platinum content usually will be within the range of from about 0.01% to about 1% by weight of the final catalyst and preferably the lower range will be used, which is from about 0.01% to about 0.1% by weight of the final catalyst. These catalysts also contain a relatively minor amount of a halogen, especially fluorine and/or chlorine. On a dry basis the chlorine content will usually be within the range of from about 0.1% to about 8% and preferably from about 0.1% to about 3%. Fluorine is generally more active than chlorine and therefore the amount of fluorine incorporated within the catalyst will usually be less and lie within the range of from about 0.1% to about 2%. The precise manner in which the halogen is present in the catalyst is not known, but it is believed to be combined with one or more of the other constituents and consequently it is often refered to as combined halogen.

I have discovered that the catalyst for the conversion of methylcyclopentane to benzene must have a limited surface area, or must have been steamed to adjust the surface area, or subjected to some other treatment, such as aging in a basic medium, for example ammonia, to adjust the surface area.

I have still further discovered that the steaming of the catalyst of this invention makes it necessary to reduce the concentration of the catalytic components in order to obtain higher conversion of naphthenes to aromatics, This is a wholly unexpected result and it forms the basis of my invention. It is well known to steam a silica-alumina composite to reduce the catalytic activity of this type of composite, and a silica-alumina composite which has had its surface area considerably reduced by a steaming operation has been found to have had its cracking activity reduced to an extent that the composite may be used as a base for reforming catalyst. On the contrary, however, I have discovered that the steaming of a non-siliceous catalyst such as an alumina-halogen composite makes it necessary for me to reduce the amounts of halogen and platinum, from that which would normally be used, in order to obtain high conversions of cycloparaffins containing 6 carbon atoms per molecule with at least 5 carbon atoms in the ring to benzene. If the steaming operation of the alumina-halogen composite merely reduced activity, it would be expected to have to use more halogen and more platinum to obtain the same degree of conversion. I have, however, discovered that it is necessary for me to do the opposite, that is I have discovered that it is necessary to use lower amounts of platinum and lower amounts of halogen in order to obtain high yields of benzene by the specific reaction. For example, a catalyst containing alumina, 0.01% platinum, and 0.75% fluorine, when steamed to effect a reduction in surface area of the catalyst, is a highly efficient catalyst for the conversion of methylcyclopentane to benzene.

Therefore, in the preferred embodiment of this invention, the alumina-fluorine composite is subjected to a treatment to effect a reduction in surface area of the catalyst before being composited with the platinum component. Some methods of preparing alumina produce a low surface area alumina and these may be used and are within the scope of this invention. The effect of steaming on conversion efficiency and the possibility of employing exceedingly low percentages of platinum and fluorine are hereinafter illustrated in the examples. While the examples are specifically concerned with reducing the surface area of the catalyst by steaming, other suitable methods such as chemical treatment by contacting the alumina with suitable reagents such as ammonia, will also effect the desired change in surface area. High temperature calcination of above about 1200° F. and preferably above about 1400° F. will also effect the desired change in surface area of the catalyst.

One method of preparing catalysts used in my process comprises adding a suitable reagent such as ammonium hydroxide, ammonium carbonate, etc. to a salt of aluminum such as aluminum chloride, aluminum nitrate, aluminum acetate, etc., in an amount to form aluminum hydroxide which upon drying is converted to alumina. The halogen may be added to the resultant slurry in the form of an acid such as hydrogen fluoride and/or hydrogen chloride or as a volatile salt such as ammonium fluoride or ammonium chloride. The exact amount of halogen that is added will lie within the ranges hereinbefore specified, and the amount added will therefore be controlled.

The alumina-halogen composite, or the alumina before the other components of the catalyst are commingled therewith, may be formed into particles. The preferred method is to add the halogen to the alumina and then form the particles and subsequently add the platinum. Regardless when the composite is to be formed into particles of uniform size and shape, this is readily accomplished by partially drying at a temperature of from about 200° F. to about 500° F. for a period of from about 2 to 24 hours or more to form a cake. The cake is ground and a suitable lubricant such as stearic acid, rosin, graphite, etc. is added to the dried and ground cake, and the composite is formed into pills of uniform size and shape in any suitable pelleting apparatus. When desired the catalyst may be formed into particles of irregular size and shape by grinding. When the pills are formed prior to the addition of platinum, the pills are preferably calcined in air at a temperature of from about 1000° F. to about 1400° F. for a period from about 1 to 8 hours or more.

In a preferred embodiment the alumina-halogen composite is treated to adjust the surface area to between about 75 to 150 sq. meters per gram. The preferred method of effecting this reduction of surface area is by steaming. The steaming may be conducted at any suitable temperature, however, a reduction in surface area is more rapidly accomplished at higher temperatures within the range of from about 1200° F. to about 1600° F. The usual steaming period is from about 1 to 8 hours or more, however, the exact time is controlled by the surface area changes. After the alumina-halogen composite is prepared, either with or without the steaming operation, it is composited with platinum in any suitable manner. A preferred method is to commingle chloroplatinic acid with ammonium hydroxide to form a mixture whose pH is within the range of from about 5 to about 10 and preferably from about 8 to about 10, and then commingle this mixture with the pre-formed particles. It is understood that the ammonium hydroxide or platinum compound first may be added to the pre-formed particles and then the other component may be added, and also that these components may be composited either as hot or cold solutions. Regardless of the method of compositing the platinum it is understood that the amount of platinum in the final catalyst will be within the ranges hereinbefore set forth. Other basic reagents may be added to the aqueous solution of chloroplatinic acid to change the pH of the solution and amines are particularly suitable.

After the platinum has been composited with the alumina, the catalyst should not be calcined or heated to a temperature above about 1100° F. and, therefore, the steaming operation is preferably performed on the alumina-halogen composite before being impregnated with the platinum-containing compound.

While platinum is a particularly suitable element for use in this catalyst, other metals of the platinum family such as ruthenium, rhodium, palladium, osmium and iridium will have similar catalytic properties, however, will not necessarily produce equivalent results.

After all the components of the catalyst have been composited the catalyst may be subjected to high temperature treatment, and one preferred method is to subject the catalyst to calcination at a temperature of from about 800° F. to about 1100° F. for a period of from about 2 to 8 hours or more. This calcining may be effected in the presence of air, a reducing atmosphere such as hydrogen, an inert atmosphere such as nitrogen or mixtures thereof. In still another embodiment the catalyst is first calcined in a reducing atmosphere and then calcined in an oxidizing atmosphere or the reverse procedure may be used.

Although the catalyst of the present invention will have a long life, it may be necessary to regenerate the catalyst after long periods of service. The regeneration may be effected by treatment with air or other oxygen-containing gas to burn the carbonaceous matter therefrom. In general, it is preferred to control the regeneration temperature not to exceed about 1200° F.

The process of the present invention may be effected in any suitable equipment. The finished catalyst may be deposited as a fixed bed in a reactor and the hydrocarbons to be treated are passed therethrough in either upward or downward flow. The catalyst may be used in a fluidized type of operation in which the catalyst and hydrocarbons are maintained in a state of turbulence under hindered settling conditions, or a fluidized fixed bed type of operation may be used in which the catalyst and hydrocarbons are maintained in a state of turbulence under hindered settling conditions and where catalyst is not withdrawn from or introduced into the reaction zone during the conversion operation. The catalyst may also be used in a moving bed type of process in which the catalyst and hydrocarbons are passed either in concurrent or countercurrent flow through a reaction zone and the catalyst may also be used in the suspensoid type of operation in which the catalyst and hydrocarbons are passed as a slurry through the reaction zone. The reactants from any of the hereinabove reaction zones are normally subjected to a further treatment to separate the benzene therefrom. The benzene may be separated from the effluent mixture in any suitable manner such as fractional distillation, solvent extraction, etc., and the unconverted components may be recycled to the reaction zone.

The reaction is preferably conducted in the presence of hydrogen which may be introduced from an extraneous source and recycled within the process or in the preferred method of operation sufficient hydrogen is produced within the process and recycled through the reaction zone during the conversion operation.

The following examples are introduced to illustrate further the novelty and utility of the present invention but not with the intention of unduly limiting the same.

EXAMPLE I

Alumina-fluorine-platinum catalysts were prepared in the following manner. Alumina was prepared by adding ammonium hydroxide to aluminum chloride to precipitate aluminum hydroxide. The aluminum hydroxide was washed with water until the aluminum hydroxide was free of chloride. A 4.8% aqueous solution of hydrofluoric acid was intimately mixed with the aluminum hydroxide to give the desired concentration of fluorine. The aluminum hydroxide-fluorine composite was then dried for 17 hours at 572° F., formed into pills and calcined in a stream of air at a temperature ranging to 1240° F. and at 1240° F. for 3 hours. The alumina-fluoride composites of catalysts A and C were steamed at 1400° F. for 6 hours. A solution of chloroplatinic acid was dissolved in water to which 1.5 ml. of reagent grade ammonium hydroxide per 100 ml. of solution was added and intimately mixed with the alumina in an amount to give the final catalyst the desired platinum concentration. The mixture was allowed to stand for one-half hour, dried on a water bath and calcined in a stream of air at 932° F. for 3 hours. The chloride brought in with the chloroplatinic acid in the calcined catalyst was extracted by repeated washing in hot 5% ammonium nitrate solution until the wash water gave a negative test for chloride. The catalyst was dried for 16 hours at 225° F. and calcined for 3 hours in a muffle furnace at 932° F. The following compositions were prepared in the above manner.

Table I

| Composition | Base | Wt. Percent Platinum | Wt. Percent Fluorine | Wt. Percent Benzene in Product |
|---|---|---|---|---|
| A | Alumina | 0.01 | 0.42 | 29.0 |
| B | do | 0.01 | 0.42 | 12.0 |
| C | do | 0.05 | 0.42 | 70.6 |
| D | do | 0.05 | 0.42 | 45.0 |
| E | do | 0.05 | 0.75 | 54.4 |
| F | do | 0.09 | 0.35 | 43.8 |

These catalysts were used for the conversion of a 97% pure methylcyclopentane fraction. The catalyst was placed in a fixed bed reactor and the methylcyclopentane was passed once through at the following conditions: 847° F. reactor outlet temperature, 260 lbs. per sq. inch pressure, 4 weight hourly space velocity, and hydrogen to hydrocarbon mol ratio of 3 to 1. The analysis of the weight percent of benzene in the product is show in Table I.

The catalysts A and C are similar to catalysts B and D respectively, except that prior to the impregnation with platinum the alumina-fluorine composites of catalysts A and C were steamed at 1400° F. for 6 hours. The surface area of catalysts B, D, E and F was 200 sq. meters per gram each and that of catalysts A and C was 112 sq. meters per gram each. It will be noted from the table that the catalysts A and C having a lower surface area were superior to the catalysts B and D of higher surface area. Catalyst E is very similar to catalyst D except that catalyst E has a higher percentage of fluorine and it is evident by comparing catalysts E and D that the higher fluorine concentration normally effects a greater degree of conversion as shown by the increase of yield from 45.0 to 56.4. However, by comparing catalyst C with catalyst E, it may be seen that the steamed catalyst C produced a higher yield of benzene, even though the fluorine content of catalyst C is lower, and this result is unexpected.

Comparing catalyst F with catalyst C, it may be seen that even though catalyst F has almost twice the platinum concentration of catalyst C, catalyst C is still a superior catalyst for the particular specific reaction.

I claim as my invention:

1. A process for the production of benzene which comprises subjecting a cycloparaffin containing 6 carbon atoms per molecule with at least 5 carbon atoms in the ring to the action of hydrogen and a non-siliceous catalyst consisting essentially of alumina, a minor amount of halogen, and a minor amount of a platinum group metal, which catalyst has a surface area between about 75 and 150 sq. meters per gram.

2. A process for the production of benzene which comprises subjecting a cycloparaffin containing 6 carbon atoms per molecule with at least 5 carbon atoms in the ring to the action of hydrogen and a non-silicious catalyst consisting essentially of alumina, a minor amount of halogen, and a minor amount of a platinum group metal which catalyst has been steamed to lower the surface area to between about 75 and 150 sq. meters per gram.

3. A process for the production of benzene which comprises subjecting a cycloparaffin containing 6 carbon atoms per molecule with at least 5 carbon atoms in the ring to the action of hydrogen and a non-siliceous catalyst consisting essentially of alumina, a minor amount of halogen, and a minor amount of a platinum group metal, which catalyst has been steamed to lower the surface area to between about 75 and 150 sq. meters per gram prior to the addition of the platinum group metal.

4. A process for the production of benzene which comprises subjecting a petroleum fraction which contains a cycloparaffin containing 6 carbon atoms per molecule with at least 5 carbon atoms in the ring to contact with hydrogen and a non-siliceous catalyst consisting essentially of alumina, from about 0.1% to about 8% of halogen by weight of the alumina on a dry basis and from about 0.01% to about 1% by weight of platinum which catalyst has a surface area between about 75 and 150 sq. meters per gram.

5. A process for the production of benzene which comprises subjecting a petroleum fraction which contains a cycloparaffin containing 6 carbon atoms per molecule with at least 5 carbon atoms in the ring to contact with hydrogen and a non-siliceous catalyst consisting essentially of alumina from about 0.1% to about 8% of halogen by weight of the alumina on a dry basis, and from about 0.01% to about 1% by weight of platinum which catalyst has been steamed to lower the surface area to between about 75 and 150 sq. meters per gram.

6. The process of claim 5 characterized in that said halogen is fluorine.

7. A process for the production of benzene which comprises subjecting a petroleum fraction which contains a cycloparaffin containing 6 carbon atoms per molecule with at least 5 carbon atoms in the ring to contact with a non-siliceous catalyst consisting essentially of alumina, from about 0.1% to about 8% of halogen by weight of the alumina on a dry basis, and from about 0.1% to about 1% by weight of platinum which catalyst has been steamed to lower the surface area to between about 75 and 150 sq. meters per gram prior to the addition of platinum.

8. A process for the production of benzene which comprises subjecting methylcyclopentane to contact with a non-siliceous catalyst consisting essentially of alumina, from about 0.01% to about 1% platinum, and from about 0.1% to about 8% halogen by weight of the alumina on a dry basis which catalyst has been steamed to adjust the surface area to between about 75 and 150 sq. meters per gram.

9. A process for the production of benzene which comprises subjecting methylcyclopentane to contact with a non-siliceous catalyst consisting essentially of alumina, from about 0.01% to about 1% platinum, and from about 0.1% to about 2% fluorine by weight of the alumina on a dry basis, which catalyst has a surface area between about 75 and 150 sq. meters per gram, the contacting being at a temperature of from about 600° F. to about 1000° F., a pressure of from about 50 lbs. per sq. inch to about 600 lbs. per sq. inch, a weight hourly space velocity of from about 0.5 to about 20, and a hydrogen to hydrocarbon mol ratio of from about 0.5 to about 20 or more mols of hydrogen per mol of hydrocarbon.

References Cited in the file of this patent

UNITED STATES PATENTS

| | | |
|---|---|---|
| 2,479,110 | Haensel | Aug. 16, 1949 |
| 2,550,531 | Ciapetta | Apr. 24, 1951 |
| 2,762,781 | Nozaki et al. | Sept. 11, 1956 |
| 2,790,015 | Hindin | Apr. 23, 1957 |